United States Patent
Merwaday et al.

(10) Patent No.: US 10,420,051 B2
(45) Date of Patent: Sep. 17, 2019

(54) CONTEXT AWARE SYNCHRONIZATION METHODS FOR DECENTRALIZED V2V NETWORKS

(71) Applicant: Intel Corporation, Santa Clara, CA (US)

(72) Inventors: Arvind Merwaday, Hillsboro, OR (US); Kuilin Clark Chen, Hillsboro, OR (US); Zongrui Ding, Portland, OR (US); Yi Zhang, Portland, OR (US); S M Iftekharul Alam, Hillsboro, OR (US); Mehnaz Rahman, Santa Clara, CA (US); Qian Li, Beaverton, OR (US); Lu Lu, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/936,777

(22) Filed: Mar. 27, 2018

(65) Prior Publication Data

US 2019/0053178 A1    Feb. 14, 2019

(51) Int. Cl.
*H04W 56/00* (2009.01)
*H04W 4/02* (2018.01)
*H04W 4/46* (2018.01)

(52) U.S. Cl.
CPC ......... *H04W 56/002* (2013.01); *H04W 4/023* (2013.01); *H04W 4/46* (2018.02)

(58) Field of Classification Search
CPC .................................................. H04W 56/002
See application file for complete search history.

(56) References Cited

U.S. PATENT DOCUMENTS

| 9,576,480 | B1* | 2/2017 | Shoshan | G08G 1/0112 |
|---|---|---|---|---|
| 9,836,062 | B1* | 12/2017 | Hayward | G08G 1/166 |
| 10,156,848 | B1* | 12/2018 | Konrardy | G05D 1/0088 |
| 10,157,539 | B1* | 12/2018 | Hoover | G08G 1/0112 |
| 2010/0256836 | A1* | 10/2010 | Mudalige | G08G 1/163 701/2 |
| 2011/0080302 | A1* | 4/2011 | Muthaiah | H04L 47/10 340/903 |
| 2013/0151062 | A1* | 6/2013 | Lee | G05D 1/0212 701/26 |

(Continued)

*Primary Examiner* — Parth Patel
(74) *Attorney, Agent, or Firm* — Jaffery Watson Mendonsa & Hamilton LLP

(57) ABSTRACT

In one example a system to manage inter-vehicle communication in a decentralized vehicle-to-vehicle network comprises a plurality of sensors to detect context information about driving conditions proximate a first vehicle; a communication interface to manage communications between the first vehicle and a second vehicle; and a controller communicatively coupled to the plurality of sensors and the communication interface and comprising processing circuitry, to receive context information from the plurality of sensors; determine, from the context information, when the first vehicle is approaching a dead zone in which contact with a communication network may be lost; and in response to a determination that the first vehicle is approaching a dead zone in which contact with a communication network may be lost, to activate a synchronization frame broadcast module to broadcast a synchronization frame via the communication interface. Other examples may be described.

21 Claims, 15 Drawing Sheets

(56) References Cited

U.S. PATENT DOCUMENTS

| | | | |
|---|---|---|---|
| 2013/0211656 A1* | 8/2013 | An | G05D 1/0221 701/25 |
| 2013/0325306 A1* | 12/2013 | Caveney | B60W 30/0953 701/117 |
| 2013/0329651 A1* | 12/2013 | Lee | H04W 52/04 370/329 |
| 2015/0154871 A1* | 6/2015 | Rothoff | G08G 1/22 701/2 |
| 2015/0241880 A1* | 8/2015 | Kim | G05D 1/0287 701/25 |
| 2015/0298694 A1* | 10/2015 | Park | B60W 30/12 701/41 |
| 2015/0355641 A1* | 12/2015 | Choi | G05D 1/021 701/23 |
| 2016/0071418 A1* | 3/2016 | Oshida | G08G 1/22 701/23 |
| 2016/0086490 A1* | 3/2016 | Ando | B60W 30/08 701/301 |
| 2016/0138924 A1* | 5/2016 | An | G01C 21/34 701/25 |
| 2016/0277196 A1* | 9/2016 | Jose | H04L 12/18 |
| 2016/0277911 A1* | 9/2016 | Kang | H04W 4/90 |
| 2017/0215119 A1* | 7/2017 | Hong | H04W 36/08 |
| 2017/0227972 A1* | 8/2017 | Sabau | G05D 1/024 |
| 2017/0251508 A1* | 8/2017 | Park | H04W 76/14 |
| 2017/0256147 A1* | 9/2017 | Shanahan | G08G 1/00 |
| 2018/0059664 A1* | 3/2018 | Jang | G05D 1/0061 |
| 2018/0101172 A1* | 4/2018 | Min | G01C 21/32 |
| 2018/0148060 A1* | 5/2018 | Hashimoto | B62D 15/0255 |
| 2018/0151066 A1* | 5/2018 | Oba | G08G 1/096725 |
| 2018/0246907 A1* | 8/2018 | Thiel | G01C 21/32 |
| 2018/0343587 A1* | 11/2018 | Condeixa | H04W 28/26 |
| 2018/0359811 A1* | 12/2018 | Verzun | H04W 88/16 |
| 2018/0376306 A1* | 12/2018 | Ramalho de Oliveira | H04W 4/44 |
| 2019/0039618 A1* | 2/2019 | Mori | B60W 30/18 |
| 2019/0047574 A1* | 2/2019 | Nishi | B60W 40/068 |
| 2019/0053178 A1* | 2/2019 | Merwaday | H04W 56/002 |
| 2019/0059071 A1* | 2/2019 | Khoryaev | H04W 4/021 |
| 2019/0090218 A1* | 3/2019 | Noh | H04W 72/005 |

* cited by examiner

510 →

| Sync Header 512 | Time Stamp 514 | Standard Deviation of Time Stamp 516 | Location Coordinates 518 | Sync Transmission End Time 520 |

| Sync Request Header 532 | Sync Start Duration 534 | Sync End Duration 536 | Sync Periodicity 538 |

FIG. 5B

CONTEXT AWARE SYNCHRONIZATION METHODS FOR DECENTRALIZED V2V NETWORKS

FIELD

The present disclosure generally relates to the field of electronics. More particularly, an embodiment relates to automotive systems and autonomous and/or machine assisted driving.

BACKGROUND

Vehicular communication systems allow vehicles to communicate safety related information, thereby helping to avoid potential accidents, improve energy savings, etc. There are different modes of communication in vehicular communication systems such as vehicle-to-infrastructure (V2I), vehicle-to-vehicle (V2V), vehicle-to-pedestrian (V2P), vehicle-to-network (V2N), etc. The term vehicle-to-everything (V2X) encompasses all modes of vehicular communication.

There are two main topologies for V2V communications: cluster based V2V networks and decentralized V2V networks. In a cluster based V2V network, one vehicle acts as a cluster head and associates other nearby vehicles into its cluster. The cluster head is responsible for scheduling and synchronization within the cluster. Timing synchronization in cluster based V2V networking is straightforward. The cluster head periodically transmits synchronization signals, and other vehicles in the cluster synchronize to the time reference transmitted by cluster head.

By contrast, in a decentralized V2V network there is no cluster head and therefore the vehicles can independently communicate with other vehicles. Synchronization of vehicles to a common time reference in decentralized V2V network is a challenging task because there is no centralized controller. One solution is to make the vehicles synchronize to standard time reference sources such as GPS, LTE networks, etc. However, GPS or LTE signals might not be available in certain dead zones, for example, inside tunnels, parking garages, etc. When vehicles enter such dead zones, the inability to synchronize to a standard time reference may inhibit their ability to communicate with other vehicles. Accordingly, systems and methods to facilitate inter-vehicle communication in decentralized V2V networks may find utility, e.g., in managing autonomous and/or machine assisted vehicles.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 5A and FIG. 5B are diagrams illustrating frame structures for context aware synchronization methods for decentralized V2V networks in accordance with some examples.

DETAILED DESCRIPTION

Figure 1A:
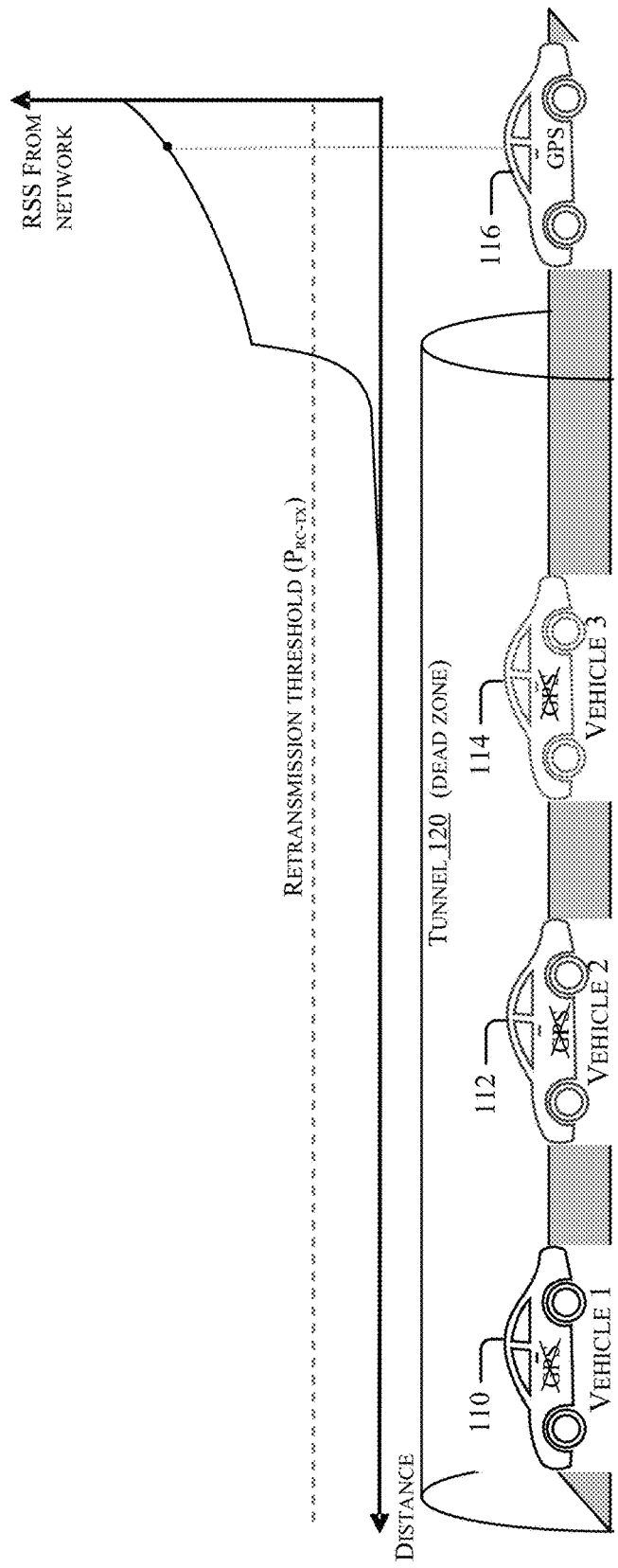
FIG. 1A is a diagram of illustrating a received signal strength (RSS) indicator at a receiver associated with a vehicle at various locations in and surrounding a tunnel.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

One existing technique to manage decentralized V2V communication networks is the Dedicated Short-Range Communications (DSRC) protocol. Devices compliant with the DSRC protocol can operate in multiple channels and require all communicating vehicles to be aligned to a common time reference (UTC modulo 1 second) for multi-channel operation. In case a local reference time source (such as GPS) is not available to a vehicle, timing advertisement (TA) frames from other vehicles can be used to estimate a time reference. The TA frame consists of time stamp using which the receiving vehicles can estimate the current standard time.

Another existing technique relevant to decentralized V2X networks is the Cellular Vehicle-to-Everything (LTE V2X) standard which uses an enhanced version of a 'sidelink' interface for V2V communications. In LTE V2X, a user equipment (UE) can transmit synchronization signals when certain conditions are satisfied. The conditions can be determined by either a network controlled trigger or a UE controlled trigger. The conditions for transmission of synchronization signals by UE covers both in-coverage and out-of-coverage scenarios.

In LTE V2X, the transmission of synchronization signals by a UE are triggered based on a threshold of the received signal strength (RSS) of a synchronization signal received from the network or from another UE. If the RSS of synchronization signal at a UE is below the threshold, then the UE starts transmitting the synchronization signals. However, this method has a disadvantage in the scenarios consisting of dead zones where the RSS of synchronization signals from the network or GPS may change abruptly.

FIG. 1 is a diagram of illustrating a received signal strength (RSS) indicator at various locations in and surrounding a tunnel. Referring to FIG. 1, where the vehicles 110, 112, and 114 are inside a tunnel 120 and have lost GPS and network synchronization. By contrast the vehicle 116 is outside the tunnel and hence is synchronized to the network or GPS. However, it will not transmit synchronization signals to the vehicles inside the tunnel because the RSS at vehicle 116 is greater than the retransmission threshold. Vehicle 116 would transmit synchronization when the RSS is smaller than the threshold, but by that time, vehicle 116 might already be inside the tunnel and may lose synchronization with GPS and the network.

To address these and other issues, described herein are various context-aware techniques for requesting and sending synchronization frames in decentralized V2V communication networks. A controller in (or communicatively coupled to) a vehicle is cognizant of its surrounding environment based on sensor data (such as camera, LIDAR, etc.), high definition maps, etc. Based on this cognizance, the controller can predict when it is entering a dead zone (such as a tunnel) where timing reference signals are not available from GPS or from network infrastructure. In such a scenario, vehicles outside the dead zone can intelligently assist the vehicles inside the dead zone by transmitting synchronization frames.

Figure 2:
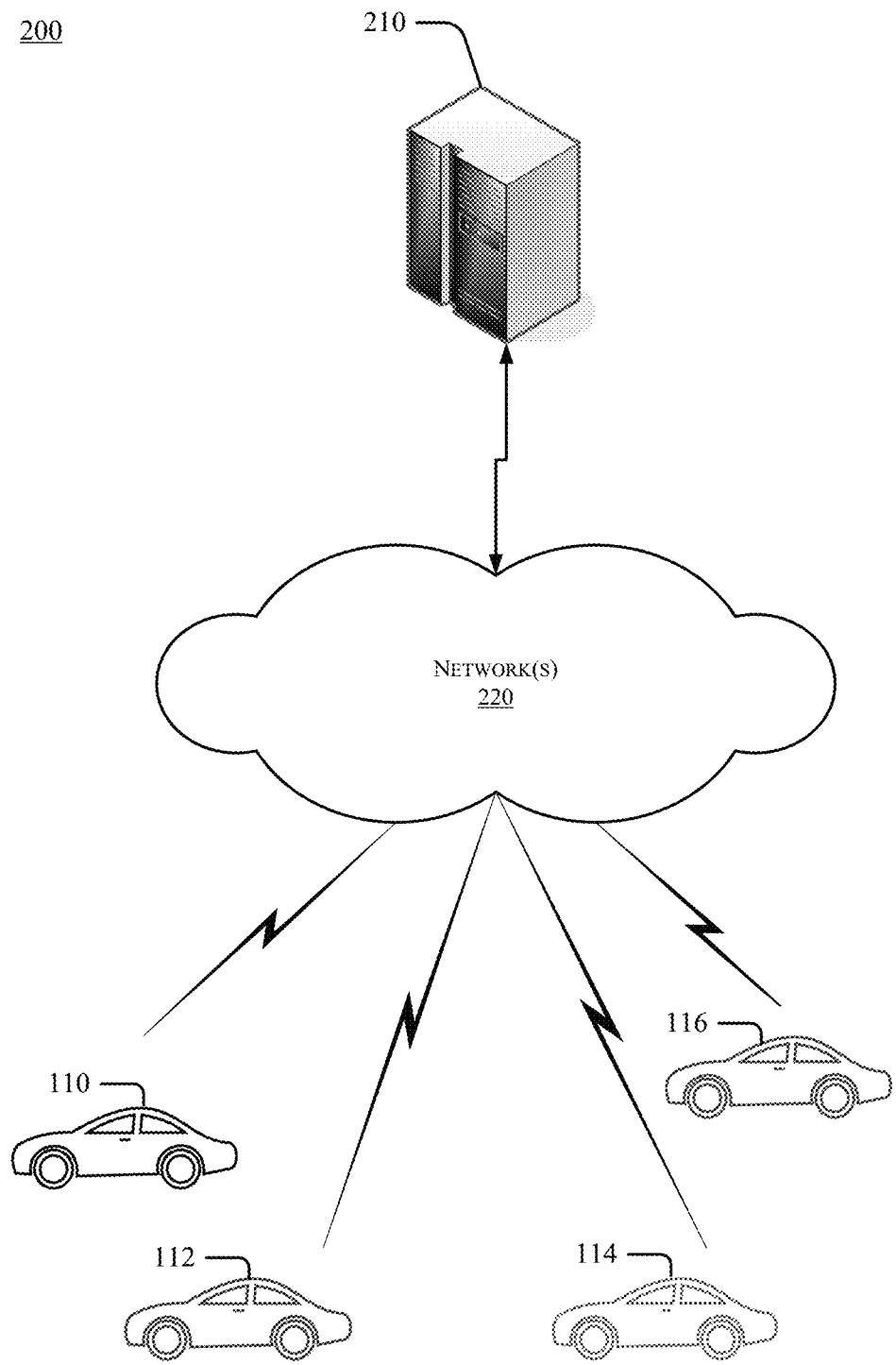
FIG. 2 is a schematic illustration of an environment for a context aware synchronization methods for decentralized V2V networks in accordance with some examples.

FIG. 2 is a schematic illustration of an environment for a context aware software update framework 200 for context aware synchronization methods for decentralized V2V networks, in accordance with some examples. Referring to FIG. 2, in some examples the environment 200 comprises a cloud-based vehicle control system 210 communicatively coupled to a communication network 220 capable of transmitting information from the vehicle management system 210 to one or more autonomous vehicles 110, 112, 114, 116.

In some examples vehicle management system 210 may comprise one or more processor-based devices, e.g., server (s) comprising computer-readable memory which executes software to collect information from autonomous vehicles 110, 112, 114, 116 and other information sources (e.g., ground-base and/or air-based sensor devices) and updates for one or more devices communicatively coupled to the one or more autonomous vehicles.

Network 220 may be embodied as a public communication network such as, e.g., the internet, or as a private communication network, such as a cellular network, or combinations thereof.). In one or more examples, network 120 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 220 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 220 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G), 5th Generation (5G) type network, and so on, and the scope of the claimed subject matter is not limited in these respects.

Figure 3:
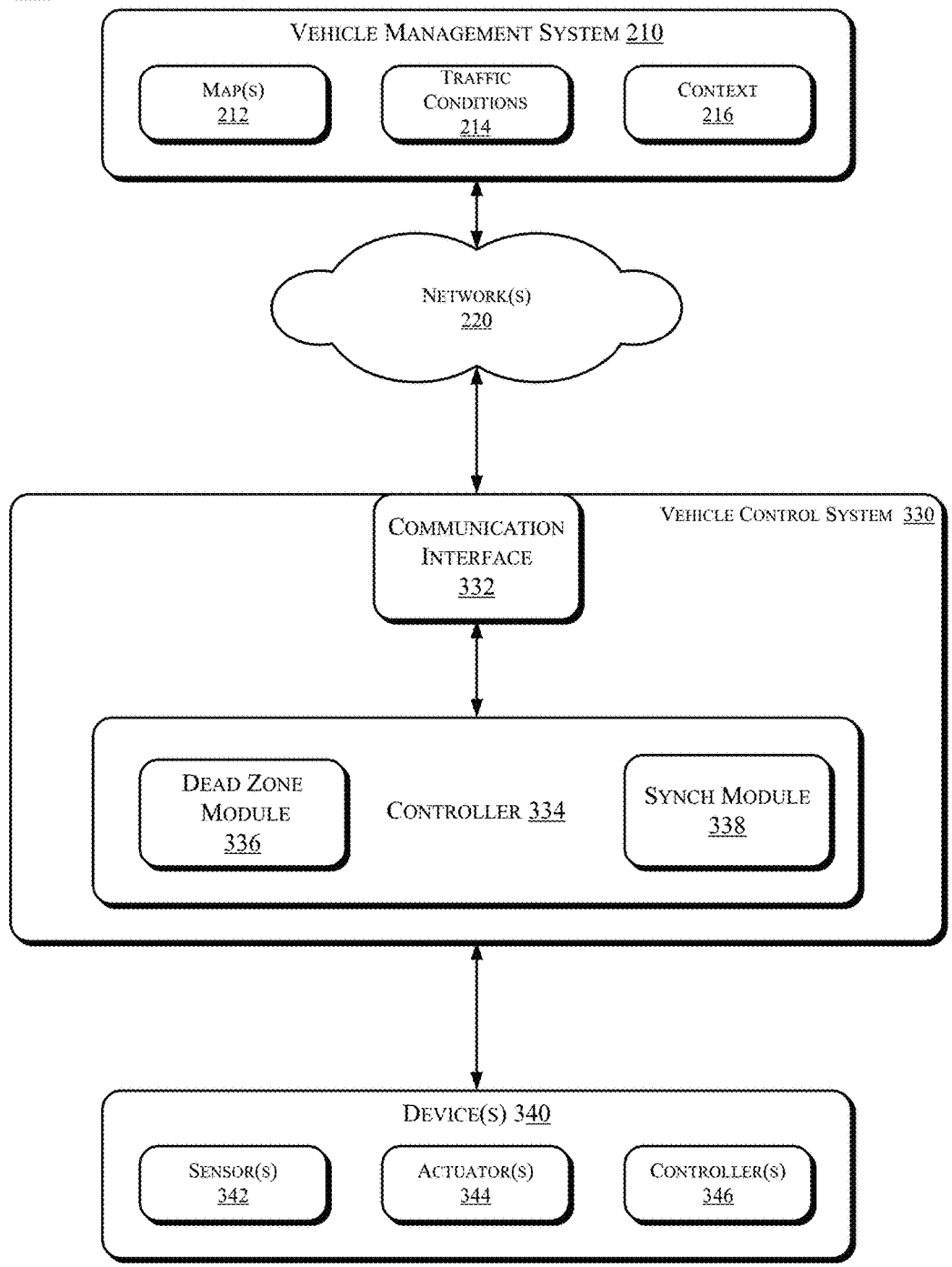
FIG. 3 is a high-level schematic illustration of an exemplary architecture to implement context aware synchronization methods for decentralized V2V networks in accordance with some examples.

FIG. 3 is a high-level schematic illustration of an exemplary architecture 300 to implement context aware synchronization methods for decentralized V2V networks in accordance with some examples. Referring to FIG. 3, in some examples the vehicle management system 210 may comprise one or more vehicle management modules which may comprise software and/or firmware which execute on the vehicle management system 210. For example, the vehicle management system may comprise a map module 212 which maintains maps of streets, a traffic conditions module 212 which collects and processes information about traffic conditions, and a route plans module 216 which plans routes for a vehicle to travel.

Information and/or instructions originating from vehicle management system 210 may be transmitted to vehicles 110, 112, 114, 116 via communication network(s) 220. A vehicle 110, 112, 114, 116 may comprise, or be communicatively coupled to, a vehicle control system 330 which controls, or assists in the control of the vehicles 110, 112, 114, 116.

Vehicle control system 330 may comprise a communication interface 332 to manage communication via network 220, a controller 334, a dead zone module 336, and a synchronization module 238. Communication interface 332 may comprise, or be coupled to, an RF transceiver which may implement a wireless connection via a protocol compliant with network 220, as described above.

Controller 334 may be embodied as general purpose processor such as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. Alternatively, controller 334 may be embodied as a low-power controller such as a field programmable gate array (FPGA) or the like. In some examples, controller 334 may comprise random access memory (RAM) and/or read-only memory (ROM).

Controller 334 may comprise one or more applications including dead zone module 336 and synchronization module 338 may be implemented as logic instructions executable on controller 334, e.g., as software or firmware, or may be reduced to hardwired logic circuits.

Controller 334 may be coupled to one or more devices 340. For example, devices 340 may include one or more sensors 342 (e.g. cameras, RADAR sensors, LIDAR sensors), actuators 344, or controllers 346.

Having described various structural aspects of a system to manage inter-vehicle communication in a decentralized vehicle-to-vehicle network, operations implemented by the structural elements will now be described with reference to FIG. 4 and FIGS. 5A-5B. In some examples the operations depicted in FIG. 4 may be implemented by dead zone module 336 and synchronization module 338 executing on the controller 334, in combination with other structural elements. Operations implemented by the controller 334 will be described with reference to communication between two vehicles, but it will be recognized that these operations may be extended to communication between more than two vehicles.

Figure 4:
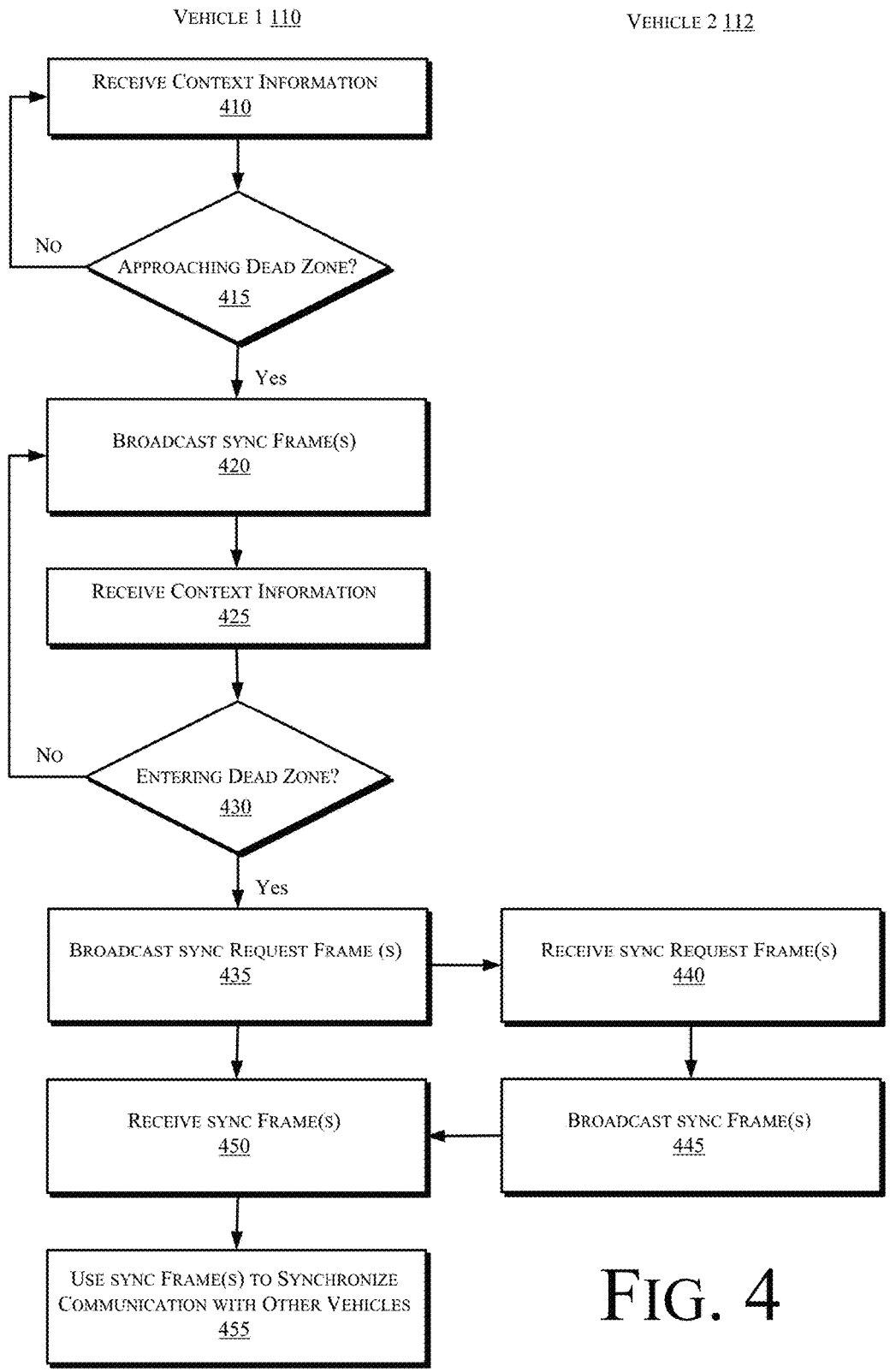
FIG. 4 is a flow diagram illustrating operations in a method to implement context aware synchronization methods for decentralized V2V networks in accordance with some examples.

Referring now to FIG. 4, at operation 410 context information is receive in the controller 334. In some examples context information may be obtained from one or more sensors 342 (e.g., cameras, RADAR, or LIDAR) on the vehicle. Alternatively, or in addition, context information may be obtained from a vehicle management system 210 via network 220.

At operation 415 the controller evaluates the context information to determine whether the context information indicates that the vehicle is approaching a dead zone in which communication with network 220 may be lost. For example, data from one or more of the sensors 342 may indicate that the vehicle is approaching a tunnel. Alternatively, the vehicle management system may monitor the location and trajectory of a vehicle and may transmit a proximity indicator warning when the vehicle is within a threshold proximity of a physical object (e.g., a tunnel) that is likely to create a dead zone in which contact with communication network 220 may be lost.

If, at operation 415, the context information does not indicate that the vehicle is approaching a dead zone then control passes back to operation 410 and the controller continues to receive and evaluate context information. By contrast, if at operation 415 the context information indicates that the vehicle is approaching a dead zone then control passes to operation 420 and the controller activates the synchronization module 338 to broadcast a synchronization frame via the communication interface 332.

One example of a synchronization frame is depicted in FIG. 5A. Referring to FIG. 5A, in one example a synchronization frame 510 comprises a header 512, a time stamp 514, a standard deviation of the time stamp 516, location coordinates 518, an a synchronization transmission end time.

The synchronization header 512 contains basic information about the frame such as frame type, transmitter ID, etc. The time stamp 514 contains an estimate of the current standard time. A receiver can use this value to enable synchronization to a standard time. The time stamp value filled by the transmitter may take into account the overhead time taken by the frame to pass through different layers of protocol stack before it is transmitted.

Depending on the source used to estimate the time stamp, there can be error in the estimated value with respect to the standard time. In some examples the controller which transmits the synchronization frame calculates the standard deviation and transmits it in the standard deviation of time stamp field 516. If the receiving vehicle has access to time stamps from multiple sources, in that case, the receiving vehicle can choose the time stamp with minimum standard deviation to achieve better synchronization accuracy.

The location coordinates field 518 contains location coordinates of the transmitting vehicle. If a vehicle in dead zone receives synchronization frames from multiple vehicles, then the receiving vehicle can use the location coordinates along with a localization method to estimate its own location approximately.

The synchronization transmission end time filed 520 indicates the absolute time at which the vehicle stops transmitting the synchronization frames.

Referring back to FIG. 4, at operation 425 the controller continues to receive context information from the sensor(s) 342 and/or from the vehicle management system 210.

At operation 430 the controller evaluates the context information to determine whether the context information indicates that the vehicle is entering a dead zone in which communication with network 220 may be lost. For example, data from one or more of the sensors 342 may indicate that the vehicle is entering a tunnel. Alternatively, the controller may monitor a received signal strength (RSS) indicator of a signal from communication network 220 and determine that the vehicle is entering a dead zone when the RSS indicator falls below a threshold.

If, at operation 430, the context information does not indicate that the vehicle is entering a dead zone then control passes back to operation 420 and the controller continues to broadcast synchronization frames and to receive and evaluate context information. By contrast, if at operation 430 the context information indicates that the vehicle is entering a dead zone then control passes to operation 435 and the controller activates the synchronization module 338 to broadcast a synchronization request frame via the communication interface 332.

One example of a synchronization request frame is depicted in FIG. 5B. Referring to FIG. 5B, in one example a synchronization request frame 530 comprises a header 532, start duration field 534, an end duration field 536, and a periodicity field 538.

The synchronization request header field contains basic information about the frame such as frame type, transmitter ID, etc.

The synchronization start duration field indicates the duration after which the synchronization frames are required. Since a vehicle has context information, it can estimate the time duration to enter the dead zone and lose GPS (or other) synchronization. This estimated duration can be used in the 'sync start duration' field.

The syncronization end duration field can include an estimate of the time duration required for the vehicle to exit the dead zone. For example, if the controller has access to a high definition (HD) map, it can estimate the time duration required for the vehicle to exit the dead zone. This estimated duration can be used in the 'sync end duration' field.

The synchronization periodicity field informs the required periodicity of the synchronization frames. The required periodicity of synchronization depends on the accuracy of the local clock source and on the required synchronization accuracy. For example, if a crystal oscillator with 20 ppm is used as a clock source, then the time error would be 20 us per second. If the required synchronization accuracy is 5 us, then the required sync periodicity can be calculated as $$T_{sync} = \frac{\text{Sync accuracy}}{\text{clock error}} = \frac{5 \text{ us}}{20 \text{ us}} = 250 \text{ ms}. \qquad \text{EQ 1}$$

Referring back to FIG. 4, at operation 440 a synchronization request frame is received at another vehicle and, in response the controller 334 in the receiving vehicle broadcasts (operation 445) one or more broadcast synchronization frames. At operation 450 the controller 334 in the which transmitted the synchronization request frame receives the broadcast synchronization frame(s), and at operation 455 the controller 334 uses the synchronization frame(s) to synchronize communication with other vehicles in the absence of a synchronization transmission signal from the network 220.

Figure 1B:
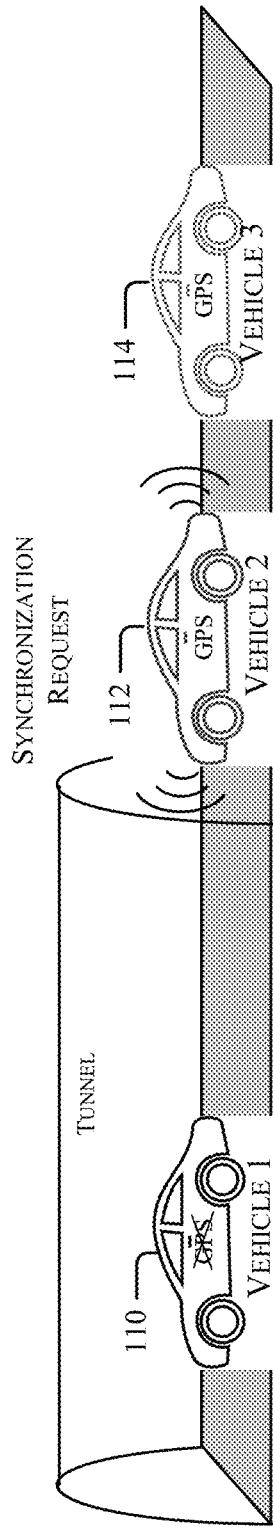
FIGS. 1B, 1C, 1D, and 1E are diagrams illustrating context aware synchronization methods for decentralized V2V networks for vehicles at various locations in and surrounding a tunnel in accordance with some examples.
Figure 1C:
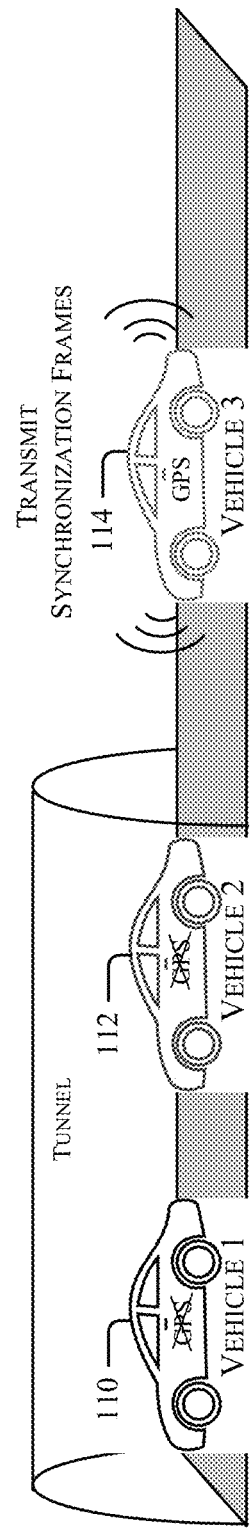

Illustrations of these techniques are provided in FIG. 1B and FIG. 1C. Referring to FIG. 1B, in a vehicle can use local context information (alone or in addition to the RSS threshold of a signal from network 220) in order to decide on transmission of synchronization frames. FIG. 1B illustrates a scenario in which vehicles inside the tunnel cannot receive GPS signals. At an arbitrary time, assume that vehicle 1 110 is inside the tunnel and has lost GPS sync. Vehicle 2 112 and vehicle 3 114 are approaching the tunnel and have GPS sync. Then, in accordance with the techniques described in FIG. 4, vehicle 2 112 detects that there is a tunnel ahead and automatically starts transmitting synchronization frames (even if vehicle 1 could not send sync request) as shown in FIG. 1B. Then, vehicle 1 110 can use these frames to synchronize to the common time reference. Vehicle 3 114 detects that there is a tunnel ahead. Since it also detects the synchronization frame transmissions from vehicle 2, the vehicle 3 will not transmit synchronization frames. Referring to FIG. 1C, in some examples when vehicle 1 110 detects that it is out of the tunnel, it transmits synchronization frames.

Figure 1D:
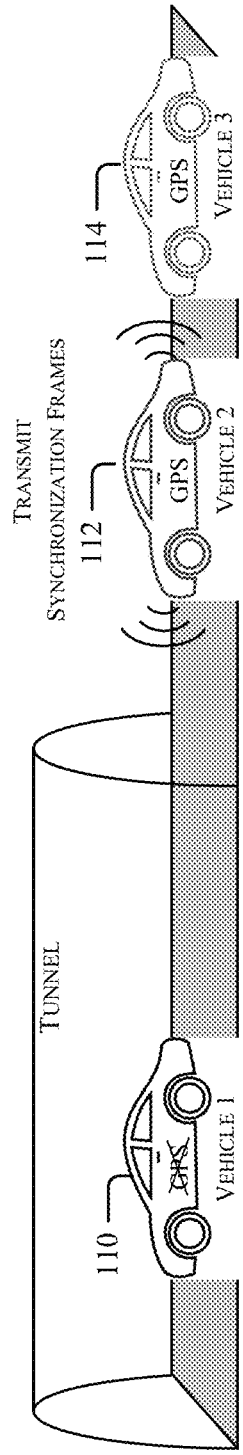
Figure 1E:
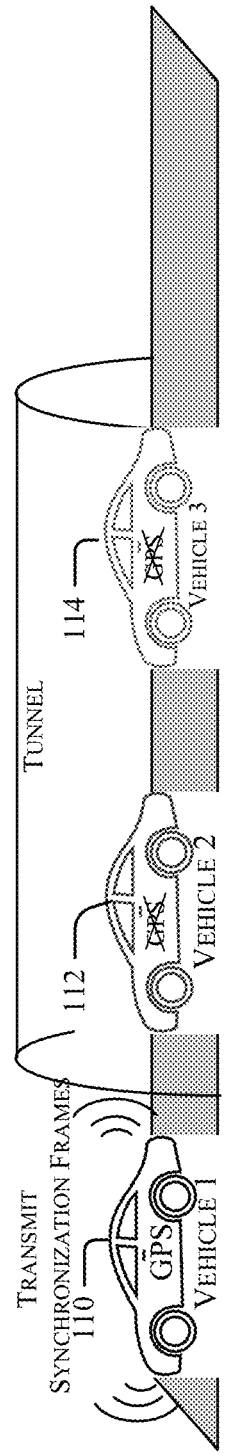

Further illustrations of these techniques are provided in FIG. 1D and FIG. 1E. Referring to FIG. 1D, vehicle 2 112 is about to enter the tunnel. According to the techniques described with reference to FIG. 4, based on context information, vehicle 2 112 detects that it is about to enter inside the tunnel and before it loses GPS sync, it broadcasts synchronization request frame as shown in FIG. 1D. As described above, the synchronization request frame may contain the time duration after which the synchronization frames are needed. The request may also contain the required periodicity and end duration for the synchronization frame transmissions. Vehicle 3 114 receives the request and starts sending the synchronization frames (FIG. 1E) based on the start duration, periodicity, and end duration requested by vehicle 2 112.

Figure 6:
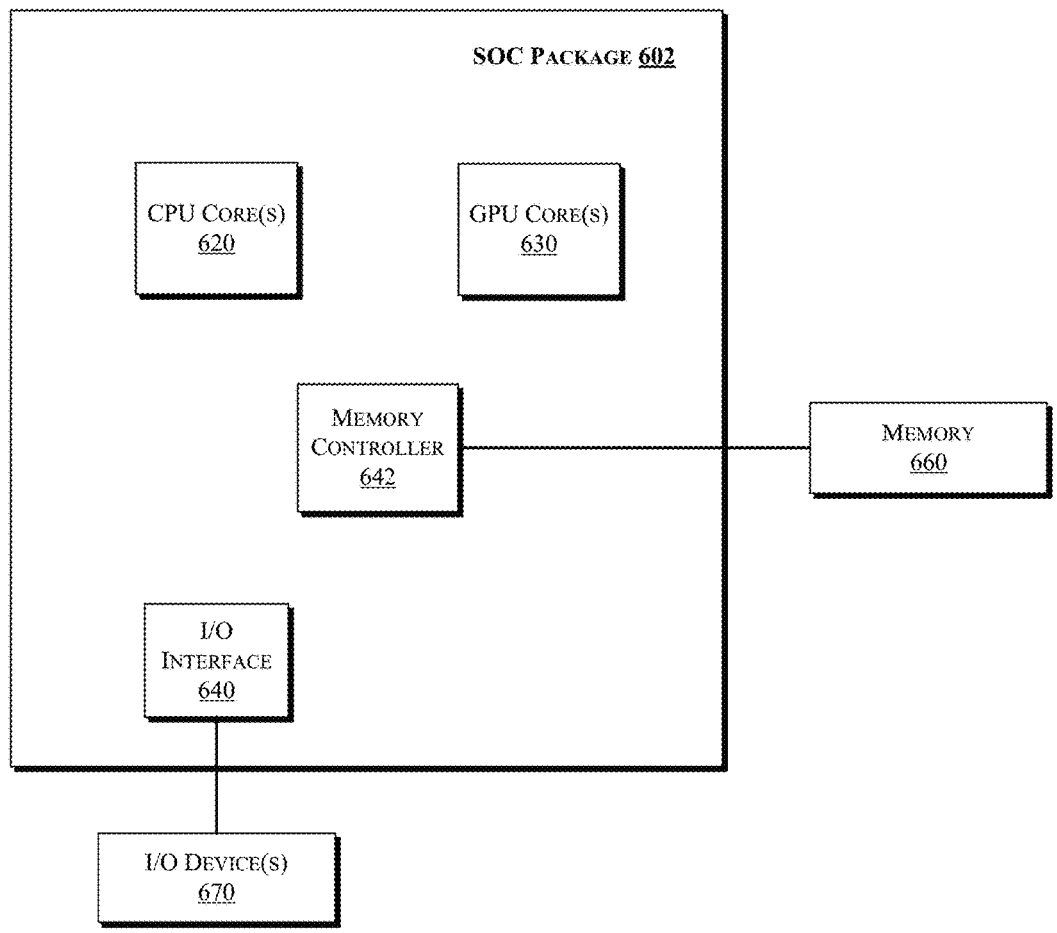
FIG. 6 illustrates a block diagram of a system on chip (SOC) package in accordance with an embodiment.

FIG. 6 illustrates a block diagram of a system on chip (SOC) package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like.

Figure 7:
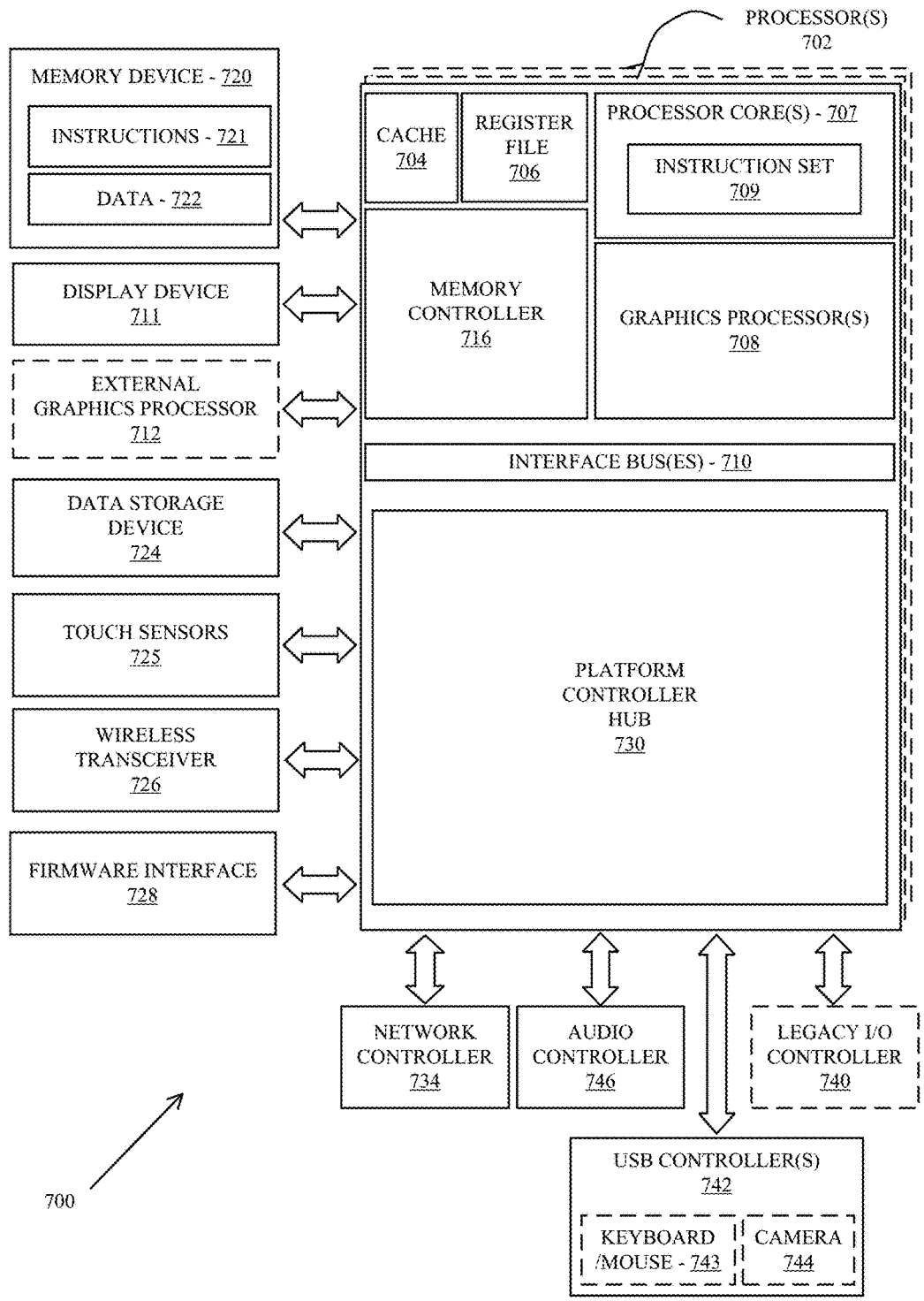
FIG. 7 is a block diagram of a processing system according to an embodiment.

FIG. 7 is a block diagram of a processing system 700, according to an embodiment. In various embodiments the system 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 907 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses.

In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, or Long Term Evolution (LTE) transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

Figure 8:
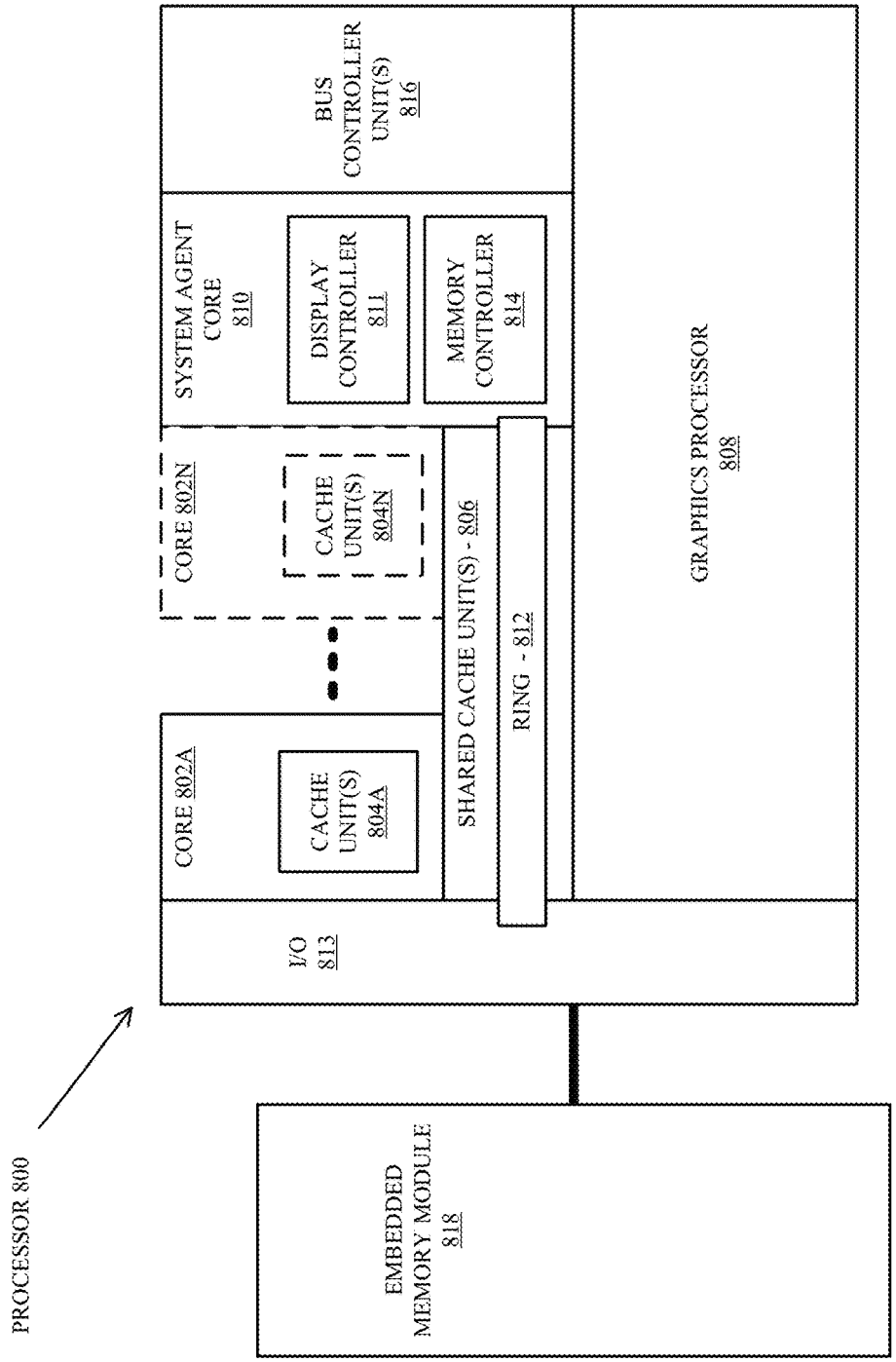
FIG. 8 is a block diagram of a processor having one or more processor cores, an integrated memory controller, and an integrated graphics processor in accordance with one or more embodiments.

FIG. 8 is a block diagram of an embodiment of a processor 800 having one or more processor cores 802A to 802N, an integrated memory controller 814, and an integrated graphics processor 808. Those elements of FIG. 8 having the same reference numbers (or names) as the elements of any other figure herein can operate or function in any manner similar to that described elsewhere herein, but are not limited to such. Processor 800 can include additional cores up to and including additional core 802N represented by the dashed lined boxes. Each of processor cores 802A to 802N includes one or more internal cache units 804A to 804N. In some embodiments each processor core also has access to one or more shared cached units 806.

The internal cache units 804A to 804N and shared cache units 806 represent a cache memory hierarchy within the processor 800. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 806 and 804A to 804N.

In some embodiments, processor 800 may also include a set of one or more bus controller units 816 and a system agent core 810. The one or more bus controller units 816 manage a set of peripheral buses, such as one or more Peripheral Component Interconnect buses (e.g., PCI, PCI Express). System agent core 810 provides management functionality for the various processor components. In some embodiments, system agent core 810 includes one or more integrated memory controllers 814 to manage access to various external memory devices (not shown).

In some embodiments, one or more of the processor cores 802A to 802N include support for simultaneous multi-threading. In such embodiment, the system agent core 810 includes components for coordinating and operating cores 802A to 802N during multi-threaded processing. System agent core 810 may additionally include a power control unit (PCU), which includes logic and components to regulate the power state of processor cores 802A to 802N and graphics processor 808.

In some embodiments, processor 800 additionally includes graphics processor 808 to execute graphics processing operations. In some embodiments, the graphics processor 808 couples with the set of shared cache units 806, and the system agent core 810, including the one or more integrated memory controllers 814. In some embodiments, a display controller 811 is coupled with the graphics processor 808 to drive graphics processor output to one or more coupled displays. In some embodiments, display controller 811 may be a separate module coupled with the graphics processor via at least one interconnect, or may be integrated within the graphics processor 808 or system agent core 810.

In some embodiments, a ring based interconnect unit 812 is used to couple the internal components of the processor 800. However, an alternative interconnect unit may be used, such as a point-to-point interconnect, a switched interconnect, or other techniques, including techniques well known in the art. In some embodiments, graphics processor 808 couples with the ring interconnect 812 via an I/O link 813.

The exemplary I/O link 813 represents at least one of multiple varieties of I/O interconnects, including an on package I/O interconnect which facilitates communication between various processor components and a high-performance embedded memory module 818, such as an eDRAM (or embedded DRAM) module. In some embodiments, each of the processor cores 802 to 802N and graphics processor 808 use embedded memory modules 818 as a shared Last Level Cache.

In some embodiments, processor cores 802A to 802N are homogenous cores executing the same instruction set architecture. In another embodiment, processor cores 802A to 802N are heterogeneous in terms of instruction set architecture (ISA), where one or more of processor cores 802A to 802N execute a first instruction set, while at least one of the other cores executes a subset of the first instruction set or a different instruction set. In one embodiment processor cores 802A to 802N are heterogeneous in terms of microarchitecture, where one or more cores having a relatively higher power consumption couple with one or more power cores having a lower power consumption. Additionally, processor 800 can be implemented on one or more chips or as an SoC integrated circuit having the illustrated components, in addition to other components.

Figure 9:
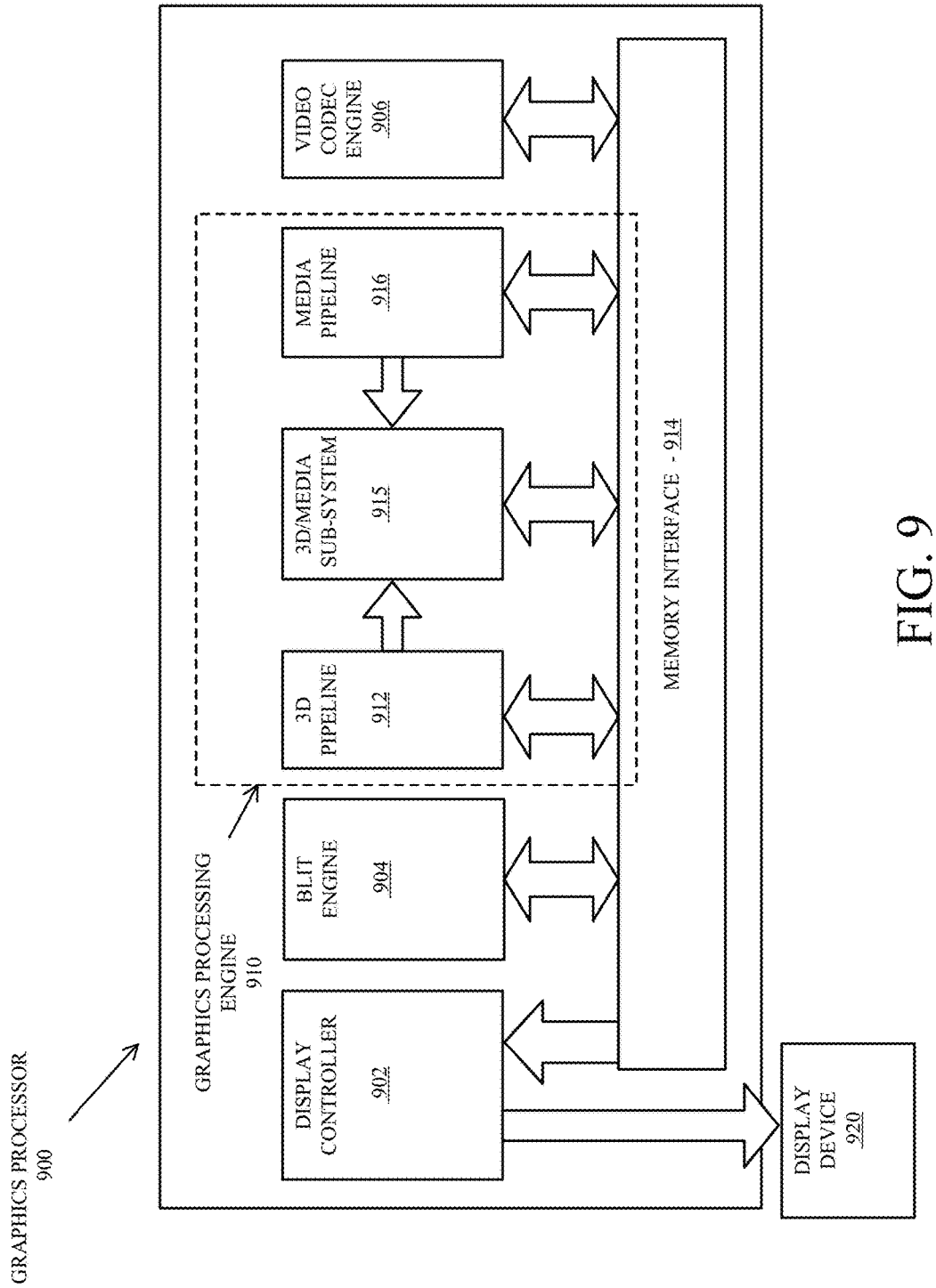
FIG. 9 is a block diagram of a graphics processor, which may be a discrete graphics processing unit, or may be a graphics processor integrated with a plurality of processing cores in accordance with one or more embodiments.

FIG. 9 is a block diagram of a graphics processor 900, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 900 includes a memory interface 914 to access memory. Memory interface 914 can be an interface to local memory, one or more internal caches, one or more shared external caches, and/or to system memory.

In some embodiments, graphics processor 900 also includes a display controller 1102 to drive display output data to a display device 920. Display controller 902 includes hardware for one or more overlay planes for the display and composition of multiple layers of video or user interface elements. In some embodiments, graphics processor 900 includes a video codec engine 906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 900 includes a block image transfer (BLIT) engine 904 to perform two-dimensional (2D) rasterizer operations including, for example, bit-boundary block transfers. However, in one embodiment, 11D graphics operations are performed using one or more components of graphics processing engine (GPE) 910. In some embodiments, graphics processing engine 910 is a compute engine for performing graphics operations, including three-dimensional (3D) graphics operations and media operations.

In some embodiments, GPE 910 includes a 3D pipeline 912 for performing 3D operations, such as rendering three-dimensional images and scenes using processing functions that act upon 3D primitive shapes (e.g., rectangle, triangle, etc.). The 3D pipeline 912 includes programmable and fixed function elements that perform various tasks within the element and/or spawn execution threads to a 3D/Media sub-system 915. While 3D pipeline 912 can be used to perform media operations, an embodiment of GPE 910 also includes a media pipeline 916 that is specifically used to perform media operations, such as video post-processing and image enhancement.

In some embodiments, media pipeline 916 includes fixed function or programmable logic units to perform one or more specialized media operations, such as video decode acceleration, video de-interlacing, and video encode acceleration in place of, or on behalf of video codec engine 906. In some embodiments, media pipeline 916 additionally includes a thread spawning unit to spawn threads for execution on 3D/Media sub-system 915. The spawned threads perform computations for the media operations on one or more graphics execution units included in 3D/Media subsystem 915.

In some embodiments, 3D/Media subsystem 915 includes logic for executing threads spawned by 3D pipeline 912 and media pipeline 916. In one embodiment, the pipelines send thread execution requests to 3D/Media subsystem 915, which includes thread dispatch logic for arbitrating and dispatching the various requests to available thread execution resources. The execution resources include an array of graphics execution units to process the 3D and media threads. In some embodiments, 3D/Media subsystem 915 includes one or more internal caches for thread instructions and data. In some embodiments, the subsystem also includes shared memory, including registers and addressable memory, to share data between threads and to store output data.

Figure 10:
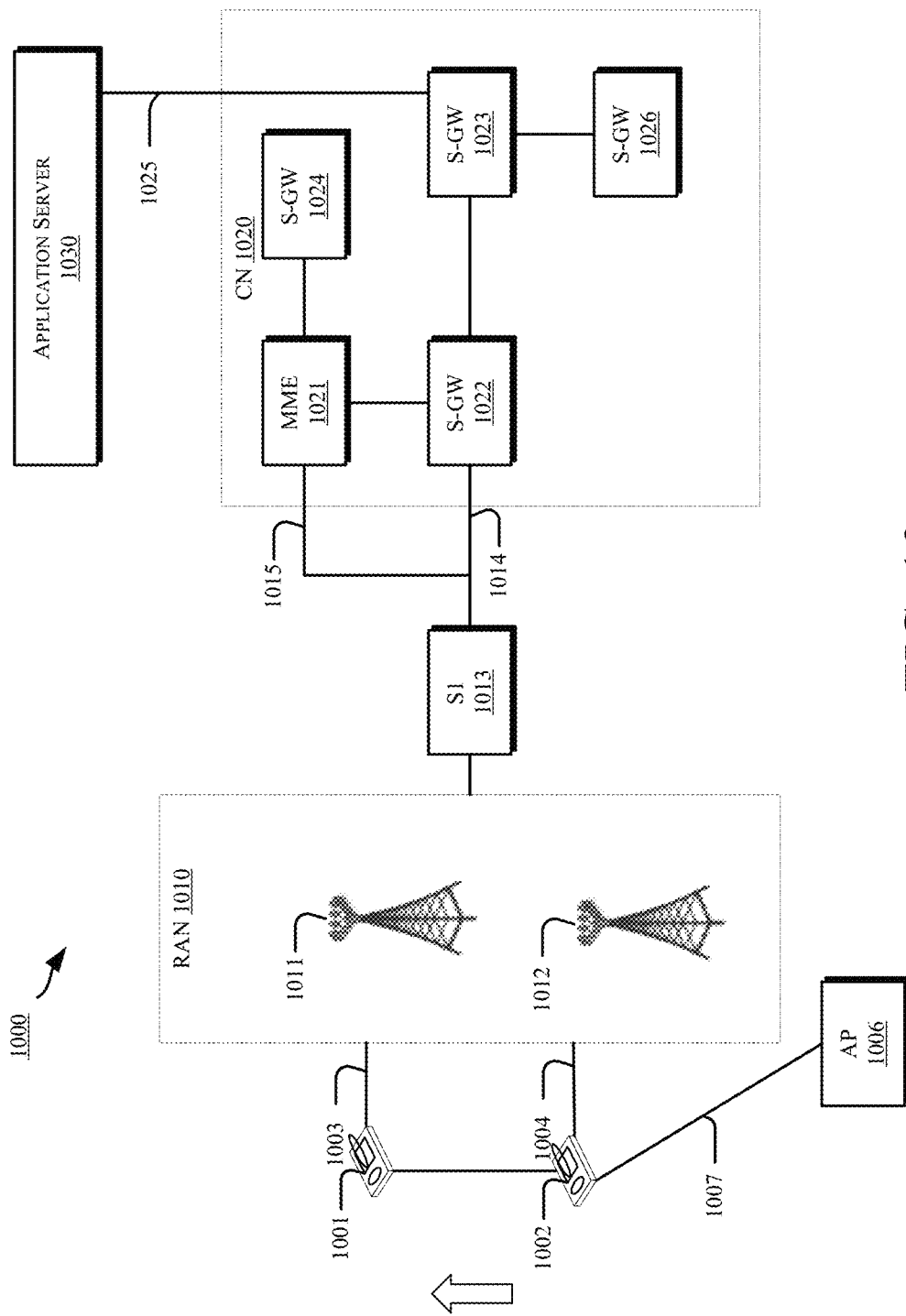
FIG. 10 illustrates an architecture of a system of a network in accordance with one or more embodiments.

FIG. 10 illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, automobile or automobile system, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an access point (AP) 1006 via connection 1007. The connection 1007 can comprise a local wireless connection, such as a connection consistent with any IEEE 802.11 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
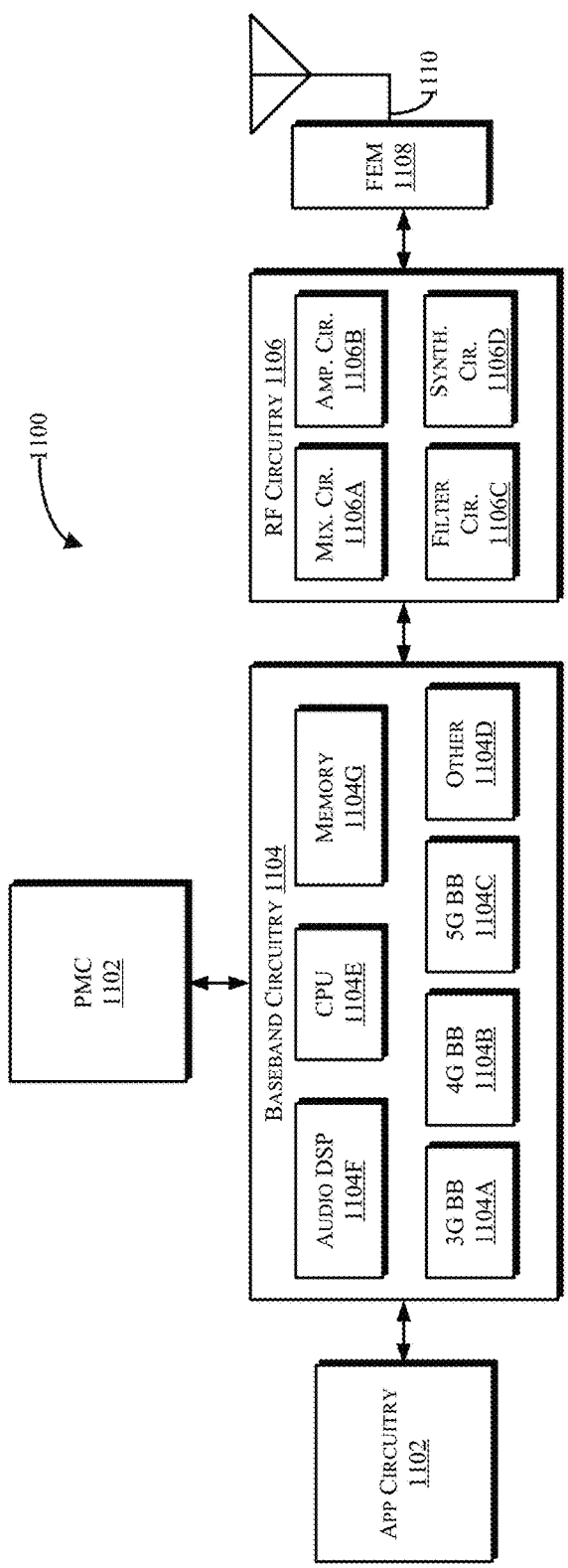
FIG. 11 illustrates example components of a wireless communication device in accordance with one or more embodiments.

FIG. 11 illustrates example components of a device in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), etc.). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), preceding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 11 12 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
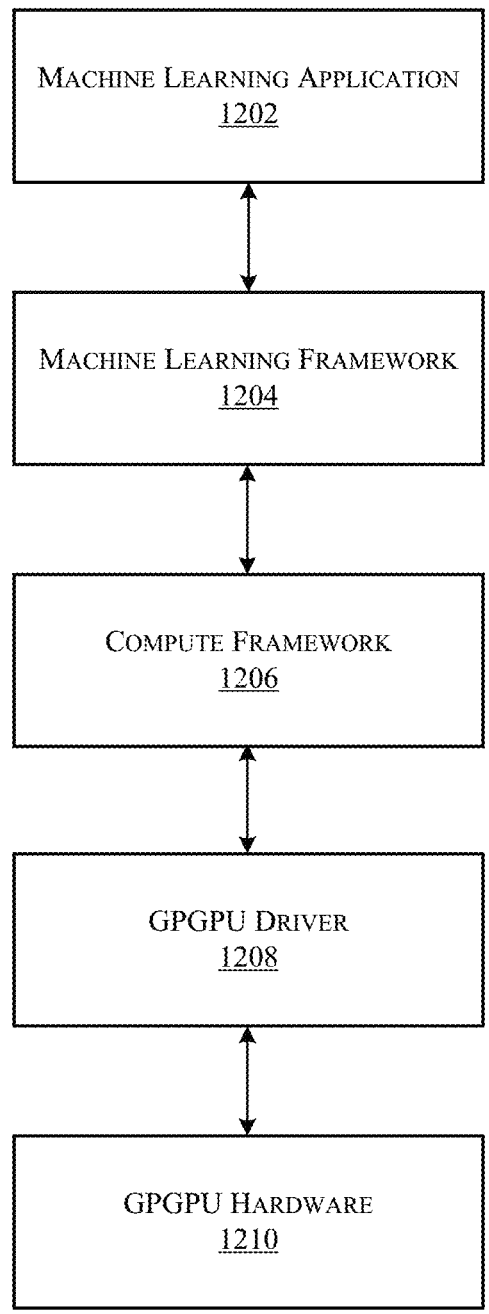
FIG. 12 is a generalized diagram of a machine learning software stack in accordance with one or more embodiments.

FIG. 12 is a generalized diagram of a machine learning software stack 1200. A machine learning application 1202 can be configured to train a neural network using a training dataset or to use a trained deep neural network to implement machine intelligence. The machine learning application 1202 can include training and inference functionality for a neural network and/or specialized software that can be used to train a neural network before deployment. The machine learning application 1202 can implement any type of machine intelligence including but not limited to image recognition, mapping and localization, autonomous navigation, speech synthesis, medical imaging, or language translation.

Hardware acceleration for the machine learning application 1202 can be enabled via a machine learning framework 1204. The machine learning framework 1204 can provide a library of machine learning primitives. Machine learning primitives are basic operations that are commonly performed by machine learning algorithms. Without the machine learning framework 1204, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 1204. Exemplary primitives include tensor convolutions, activation functions, and pooling, which are computational operations that are performed while training a convolutional neural network (CNN). The machine learning framework 1204 can also provide primitives to implement basic linear algebra subprograms performed by many machine-learning algorithms, such as matrix and vector operations.

The machine learning framework 1204 can process input data received from the machine learning application 1202 and generate the appropriate input to a compute framework 1206. The compute framework 1206 can abstract the underlying instructions provided to the GPGPU driver 1208 to enable the machine learning framework 1204 to take advantage of hardware acceleration via the GPGPU hardware 1210 without requiring the machine learning framework 1204 to have intimate knowledge of the architecture of the GPGPU hardware 1210. Additionally, the compute framework 1206 can enable hardware acceleration for the machine learning framework 1204 across a variety of types and generations of the GPGPU hardware 1210.

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 13:
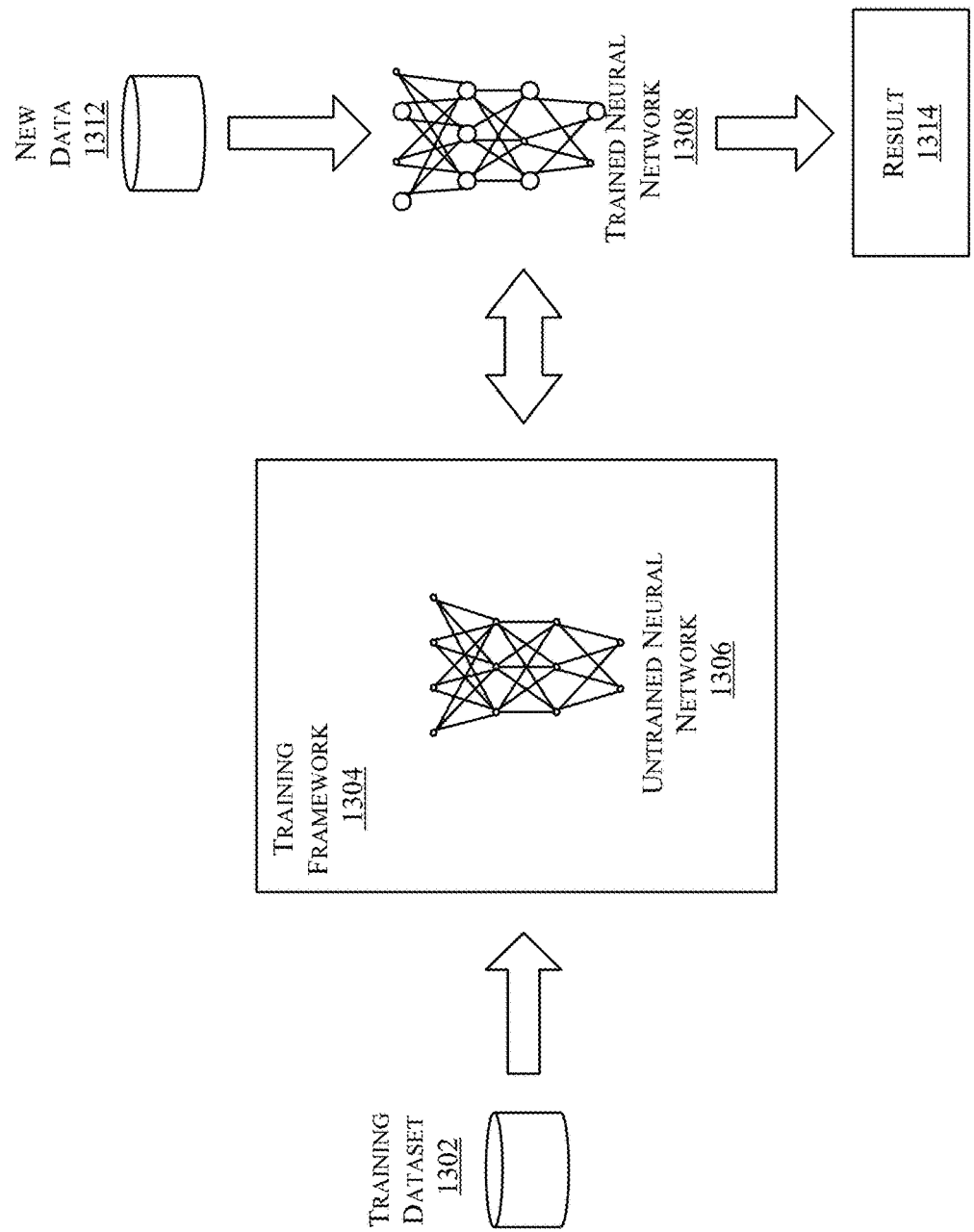
FIG. 13 illustrates training and deployment of a deep neural network in accordance with one or more embodiments.

FIG. 13 illustrates training and deployment of a deep neural network. Once a given network has been structured for a task the neural network is trained using a training dataset 1302. Various training frameworks have been developed to enable hardware acceleration of the training process. For example, the machine learning framework 1204 of FIG. 12 may be configured as a training framework 1304. The training framework 1304 can hook into an untrained neural network 1306 and enable the untrained neural net to be trained using the parallel processing resources described herein to generate a trained neural network 1308. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1302 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1304 can adjust to adjust the weights that control the untrained neural network 1306. The training framework 1304 can provide tools to monitor how well the untrained neural network 1306 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1308. The trained neural network 1308 can then be deployed to implement any number of machine learning operations.

Unsupervised learning is a learning method in which the network attempts to train itself using unlabeled data. Thus, for unsupervised learning the training dataset 1302 will include input data without any associated output data. The untrained neural network 1306 can learn groupings within the unlabeled input and can determine how individual inputs are related to the overall dataset. Unsupervised training can be used to generate a self-organizing map, which is a type of trained neural network 1307 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1302 includes a mix of labeled and unlabeled data of the same distribution. Incremental learning is a variant of supervised learning in which input data is continuously used to further train the model. Incremental learning enables the trained neural network 1308 to adapt to the new data 1312 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

The following examples pertain to further embodiments.

Example 1 may comprise system to manage inter-vehicle communication in a decentralized vehicle-to-vehicle network, comprising a plurality of sensors to detect context information about driving conditions proximate a first vehicle; a communication interface to manage communications between the first vehicle and a second vehicle; and a controller communicatively coupled to the plurality of sensors and the communication interface and comprising processing circuitry, to receive context information from the plurality of sensors; determine, from the context information, when the first vehicle is approaching a dead zone in which contact with a communication network may be lost; and in response to a determination that the first vehicle is approaching a dead zone in which contact with a communication network may be lost, to activate a synchronization frame broadcast module to broadcast a synchronization frame via the communication interface.

Example 2 may comprise the subject matter of any preceding claim, wherein the plurality of sensors comprises at least one of a video sensor, a RADAR sensor, or a LIDAR sensor.

Example 3 may comprise the subject matter of any preceding claim, wherein the controller comprises processing circuitry to receive context information from a remote vehicle management system; and determine, from the context information, when the first vehicle is approaching a dead zone in which contact with a communication network may be lost.

Example 4 may comprise the subject matter of any preceding claim, wherein the context information received from the remote vehicle management system comprises a proximity indicator that the first vehicle is within a threshold proximity of a physical object capable to create a dead zone in which contact with a communication network may be lost.

Example 5 may comprise the subject matter of any preceding claim, wherein synchronization frame comprises a synchronization frame header; a time stamp; a standard deviation of the time stamp with respect to a standard time reference; a location coordinate; and a synchronization frame transmission end time.

Example 6 may comprise the subject matter of any preceding claim, further comprising processing circuitry to determine, from the context information, when the first vehicle is entering a dead zone in which contact with a communication network may be lost; and in response to a determination that the first vehicle is entering a dead zone in which contact with a communication network may be lost, to activate the synchronization frame broadcast module to broadcast a synchronization frame request via the communication interface.

Example 7 may comprise the subject matter of any preceding claim, wherein synchronization frame request comprises: a synchronization frame request header; a synchronization start duration; a synchronization end duration; and a synchronization periodicity.

Example 8 may comprise the subject matter of any preceding claim, further comprising processing circuitry to receive, in response to the synchronization frame request, a synchronization frame; and use the synchronization frame to synchronize communication with the second vehicle.

Example 9 may comprise a vehicle control system comprising a communication interface to manage communications between the first vehicle and a second vehicle; and processing circuitry to receive context information from the plurality of sensors; determine, from the context information, when the first vehicle is approaching a dead zone in which contact with a communication network may be lost; and in response to a determination that the first vehicle is approaching a dead zone in which contact with a communication network may be lost, to activate a synchronization frame broadcast module to broadcast a synchronization frame via the communication interface.

Example 10 may comprise the subject matter of any preceding claim, wherein the plurality of sensors comprises at least one of a video sensor, a RADAR sensor, or a LIDAR sensor.

Example 11 may comprise the subject matter of any preceding claim, wherein the controller comprises processing circuitry to receive context information from a remote vehicle management system; and determine, from the context information, when the first vehicle is approaching a dead zone in which contact with a communication network may be lost.

Example 12 may comprise the subject matter of any preceding claim, wherein the context information received from the remote vehicle management system comprises a proximity indicator that the first vehicle is within a threshold proximity of a physical object capable to create a dead zone in which contact with a communication network may be lost.

Example 13 may comprise the subject matter of any preceding claim, wherein synchronization frame comprises a synchronization frame header; a time stamp; standard deviation of the time stamp with respect to a standard time reference; a location coordinate; and a synchronization frame transmission end time.

Example 14 may comprise the subject matter of any preceding claim, further comprising processing circuitry to determine, from the context information, when the first vehicle is entering a dead zone in which contact with a communication network may be lost; and in response to a determination that the first vehicle is entering a dead zone in which contact with a communication network may be lost, to activate the synchronization frame broadcast module to broadcast a synchronization frame request via the communication interface.

Example 15 may comprise the subject matter of any preceding claim, wherein synchronization frame request comprises a synchronization frame request header; synchronization start duration; a synchronization end duration; and a synchronization periodicity.

Example 16 may comprise the subject matter of any preceding claim, further comprising processing circuitry to receive, in response to the synchronization frame request, a synchronization frame; and use the synchronization frame to synchronize communication with the second vehicle.

Example 17 may comprise a method to manage inter-vehicle communication in a decentralized vehicle-to-vehicle network, comprising receiving context information from a plurality of sensors; determining, from the context information, when the first vehicle is approaching a dead zone in which contact with a communication network may be lost; and in response to a determination that the first vehicle is approaching a dead zone in which contact with a communication network may be lost, activating a synchronization frame broadcast module to broadcast a synchronization frame via the communication interface.

Example 18 may comprise the subject matter of any preceding claim, wherein the plurality of sensors comprises at least one of a video sensor, a RADAR sensor, or a LIDAR sensor.

Example 19 may comprise the subject matter of any preceding claim, further comprising receiving context information from a remote vehicle management system; and determining, from the context information, when the first vehicle is approaching a dead zone in which contact with a communication network may be lost.

Example 20 may comprise the subject matter of any preceding claim, wherein the context information received from the remote vehicle management system comprises a proximity indicator that the first vehicle is within a threshold proximity of a physical object capable to create a dead zone in which contact with a communication network may be lost.

Example 21 may comprise the subject matter of any preceding claim, wherein synchronization frame comprises a synchronization frame header; a time stamp; a standard deviation of the time stamp with respect to a standard time reference; a location coordinate; and a synchronization frame transmission end time.

Example 22 may comprise the subject matter of any preceding claim, further comprising determining, from the context information, when the first vehicle is entering a dead zone in which contact with a communication network may be lost; and in response to a determination that the first vehicle is entering a dead zone in which contact with a communication network may be lost, activating the synchronization frame broadcast module to broadcast a synchronization frame request via the communication interface.

Example 23 may comprise the subject matter of any preceding claim, wherein synchronization frame request comprises a synchronization frame request header; synchronization start duration; a synchronization end duration; and a synchronization periodicity.

Example 24 may comprise the subject matter of any preceding claim, further comprising receiving, in response to the synchronization frame request, a synchronization frame; and using the synchronization frame to synchronize communication with the second vehicle.

In various embodiments, the operations discussed herein, e.g., with reference to the figures described herein, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to the present figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A system to manage inter-vehicle communication in a decentralized vehicle-to-vehicle network, comprising:
    a plurality of sensors to detect context information about driving conditions proximate a first vehicle;
    a communication interface to manage communications between the first vehicle and a second vehicle; and
    a controller communicatively coupled to the plurality of sensors and the communication interface and comprising processing circuitry, to:
        receive context information from the plurality of sensors;
        determine, from the context information, when the first vehicle is approaching a dead zone in which contact with a communication network may be lost; and
        in response to a determination that the first vehicle is approaching a dead zone in which contact with a communication network may be lost, to activate a synchronization frame broadcast module to broadcast a synchronization frame via the communication interface, wherein synchronization frame comprises:
    a synchronization frame header;
    a time stamp;
    a standard deviation of the time stamp with respect to a standard time reference;
    a location coordinate; and
    a synchronization frame transmission end time.

2. The system of claim 1, wherein the plurality of sensors comprises at least one of a video sensor, a RADAR sensor, or a LIDAR sensor.

3. The system of claim 2, wherein the controller comprises processing circuitry to:
    receive context information from a remote vehicle management system; and determine, from the context information, when the first vehicle is approaching a dead zone in which contact with a communication network may be lost.

4. The system of claim 3, wherein the context information received from the remote vehicle management system comprises a proximity indicator that the first vehicle is within a threshold proximity of a physical object capable to create a dead zone in which contact with a communication network may be lost.

5. The system of claim 1, further comprising processing circuitry to:
   determine, from the context information, when the first vehicle is entering a dead zone in which contact with a communication network may be lost; and
   in response to a determination that the first vehicle is entering a dead zone in which contact with a communication network may be lost, to activate the synchronization frame broadcast module to broadcast a synchronization frame request via the communication interface.

6. The system of claim 5, wherein synchronization frame request comprises:
   a synchronization frame request header;
   synchronization start duration;
   a synchronization end duration; and
   a synchronization periodicity.

7. The system of claim 5, further comprising processing circuitry to:
   receive, in response to the synchronization frame request, a synchronization frame; and
   use the synchronization frame to synchronize communication with the second vehicle.

8. A vehicle control system comprising:
   a communication interface to manage communications between the first vehicle and a second vehicle; and
   processing circuitry to:
   receive context information from the plurality of sensors;
      determine, from the context information, when the first vehicle is approaching a dead zone in which contact with a communication network may be lost; and
      in response to a determination that the first vehicle is approaching a dead zone in which contact with a communication network may be lost, to activate a synchronization frame broadcast module to broadcast a synchronization frame via the communication interface, wherein synchronization frame comprises:
   a synchronization frame header;
   a time stamp;
   a standard deviation of the time stamp with respect to a standard time reference;
   a location coordinate; and
   a synchronization frame transmission end time.

9. The system of claim 8, wherein the plurality of sensors comprises at least one of a video sensor, a RADAR sensor, or a LIDAR sensor.

10. The system of claim 9, wherein the controller comprises processing circuitry to:
   receive context information from a remote vehicle management system; and
   determine, from the context information, when the first vehicle is approaching a dead zone in which contact with a communication network may be lost.

11. The system of claim 10, wherein the context information received from the remote vehicle management system comprises a proximity indicator that the first vehicle is within a threshold proximity of a physical object capable to create a dead zone in which contact with a communication network may be lost.

12. The system of claim 8, further comprising processing circuitry to:
   determine, from the context information, when the first vehicle is entering a dead zone in which contact with a communication network may be lost; and
   in response to a determination that the first vehicle is entering a dead zone in which contact with a communication network may be lost, to activate the synchronization frame broadcast module to broadcast a synchronization frame request via the communication interface.

13. The system of claim 12, wherein synchronization frame request comprises:
   a synchronization frame request header;
   synchronization start duration;
   a synchronization end duration; and
   a synchronization periodicity.

14. The system of claim 12, further comprising processing circuitry to:
   receive, in response to the synchronization frame request, a synchronization frame; and
   use the synchronization frame to synchronize communication with the second vehicle.

15. A method to manage inter-vehicle communication in a decentralized vehicle-to-vehicle network, comprising:
   receiving context information from a plurality of sensors;
   determining, from the context information, when the first vehicle is approaching a dead zone in which contact with a communication network may be lost; and
   in response to a determination that the first vehicle is approaching a dead zone in which contact with a communication network may be lost, activating a synchronization frame broadcast module to broadcast a synchronization frame via the communication interface, wherein synchronization frame comprises:
   a synchronization frame header;
   a time stamp;
   a standard deviation of the time stamp with respect to a standard time reference;
   a location coordinate; and
   a synchronization frame transmission end time.

16. The method of claim 15, wherein the plurality of sensors comprises at least one of a video sensor, a RADAR sensor, or a LIDAR sensor.

17. The method of claim 16, further comprising:
   receiving context information from a remote vehicle management system; and
   determining, from the context information, when the first vehicle is approaching a dead zone in which contact with a communication network may be lost.

18. The method of claim 17, wherein the context information received from the remote vehicle management system comprises a proximity indicator that the first vehicle is within a threshold proximity of a physical object capable to create a dead zone in which contact with a communication network may be lost.

19. The method of claim 15, further comprising:
   determining, from the context information, when the first vehicle is entering a dead zone in which contact with a communication network may be lost; and
   in response to a determination that the first vehicle is entering a dead zone in which contact with a communication network may be lost, activating the synchronization frame broadcast module to broadcast a synchronization frame request via the communication interface.

20. The method of claim 19, wherein synchronization frame request comprises:
   a synchronization frame request header;
   synchronization start duration;
   a synchronization end duration; and
   a synchronization periodicity.

21. The method of claim 20, further comprising:
   receiving, in response to the synchronization frame request, a synchronization frame; and
   using the synchronization frame to synchronize communication with the second vehicle.

* * * * *